L. FRANKLIN.
SPECTACLES.
No. 194,345. Patented Aug. 21, 1877.
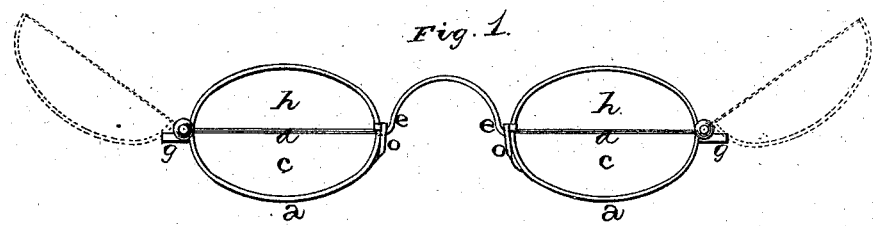
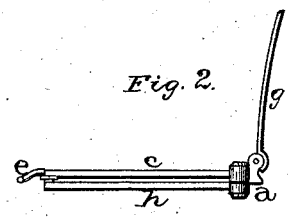
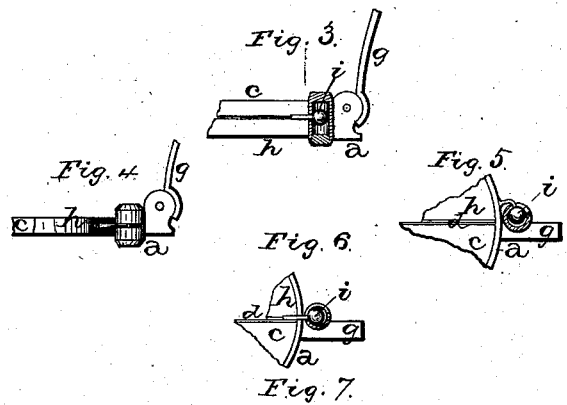
WITNESSES
INVENTOR.

UNITED STATES PATENT OFFICE.

LOUIS FRANKLIN, OF PLATTEVILLE, IOWA.

IMPROVEMENT IN SPECTACLES.

Specification forming part of Letters Patent No. 194,345, dated August 21, 1877; application filed June 27, 1877.

*To all whom it may concern:*

Be it known that I, LOUIS FRANKLIN, of Platteville, in the county of Taylor and State of Iowa, have invented certain new and useful Improvements in Spectacles; and I do hereby declare the following to be a full, clear, and exact description of the invention, such as will enable others skilled in the art to which it pertains to make and use it, reference being had to the accompanying drawings, which form part of this specification.

My invention relates to an improvement in spectacles; and it consists in so combining the two glasses that the upper one can be removed or folded back out of the way, so as not to obstruct the vision, or it can be folded down over the lower one, so as to form a double thickness, and thereby increase its power for reading at night, as will be more fully described hereinafter.

The accompanying drawings represent my invention.

*a* represents one-half of the usual framework, in which the lower glass *c* is secured by means of a very fine metallic band, *d*, that has one end fastened to the nose-piece *e*, and the other to the outer end of the frame, to which the bows *g* are pivoted. This lower glass is used for reading in the day-time, or for doing any ordinary work, and so will be of any desired power.

The upper glass *h* is inclosed in a very light frame, and is provided with a hinge, ball-and-socket joint, or hook, *i*, for the purpose of fastening it to the frame *a* at its outer end, and a suitable catch, *o*, for fastening its inner end to the nose-piece *e*. By means of these two parts *i o* the upper glass *h* can be moved backward when not desired for seeing at a distance, or any similar purpose, or can be removed entirely from the frame, or turned down over the lower glass, so as to form a double thickness, and thus increase its power.

It is a well-known fact that a much stronger glass is required for reading at night than during the day, and hence many persons are obliged to have two separate pairs. In order to prevent this expense and trouble, and to make one pair answer both purposes, the upper glass *h* can be folded down over the lower one, thereby forming a double thickness of glass, and thus increasing the power, so that they can be used for reading by lamp and gas light. In order to allow the upper glass to be moved backward the end of the frame is slotted, as shown. By making this slot from the outer side, and bending the pin as shown in Fig. 5, the slot serves as a stop to prevent the upper glass from dropping down below the top edge of the lower one. In Fig. 7 the top glass is shown as being adapted to be removed altogether from the frame when not needed. In this case there will be a light spring attached to the nose-piece, and another to the outer end of the frame, and these springs will snap into holes made in each end of the frame for the upper glass.

Having thus described my invention, I claim—

1. In spectacles, the combination of the two glasses *c h*, the one, *c*, being rigidly fastened to the frame *a*, and the other, *h*, provided with a joint at one end, whereby it can be folded down over the lower glass, substantially as shown.

2. In spectacles, the combination of the stationary glass *c*, frame *a*, glass *h*, ball *i*, and slotted socket, whereby the glass *h* can be moved backward out of the way, or folded downward over the front of the glass *c*, substantially as described.

In testimony that I claim the foregoing I have hereunto set my hand this 31st day of March, 1877.

L. FRANKLIN.

Witnesses:
JOHN FLICK,
P. C. KING.